UNITED STATES PATENT OFFICE.

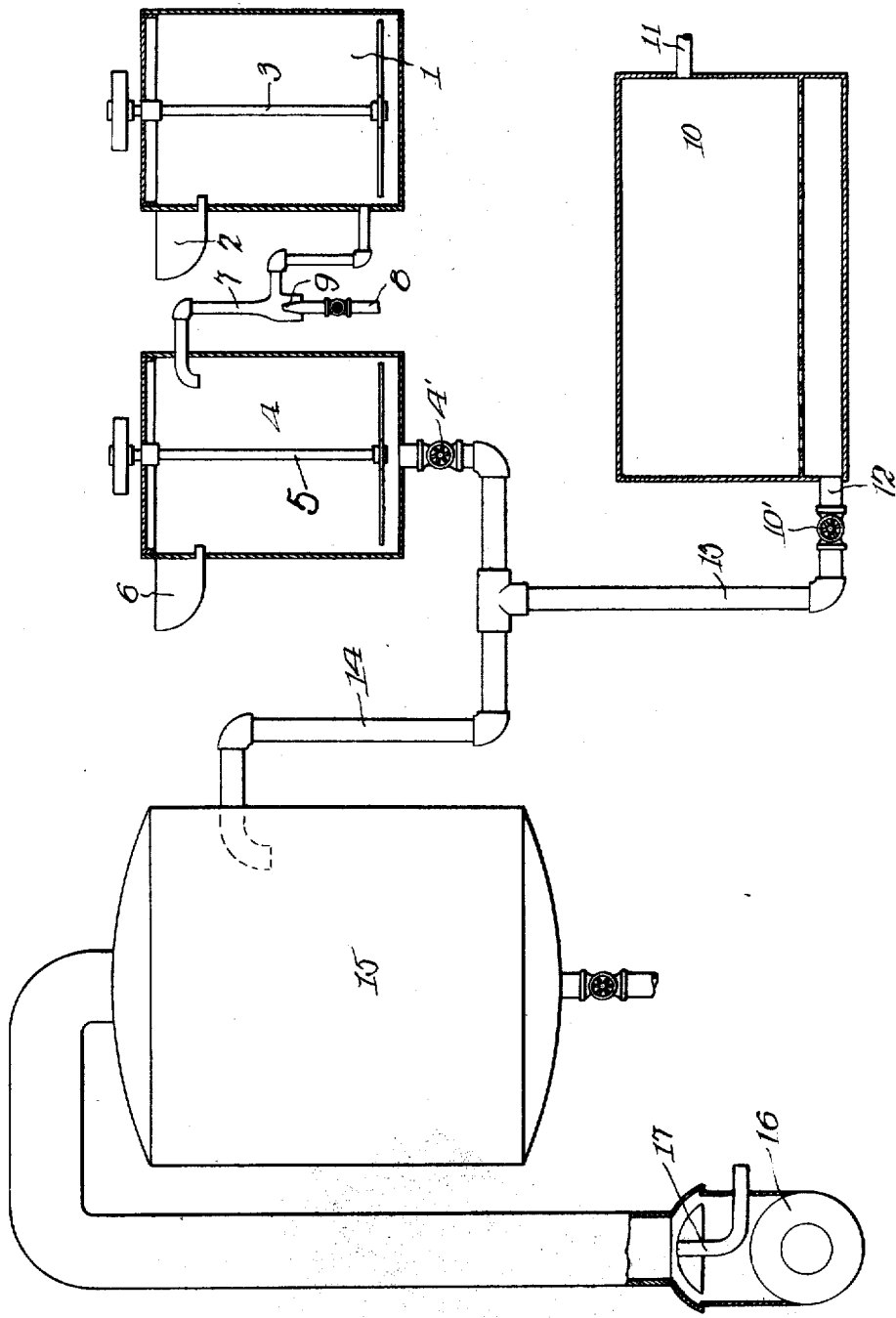

WILLIAM P. M. GRELCK, OF LINCOLN, NEBRASKA.

MILK-FOOD PRODUCT AND METHOD OF MAKING THE SAME.

1,272,035.          Specification of Letters Patent.          Patented July 9, 1918.

Application filed December 26, 1916. Serial No. 138,724.

*To all whom it may concern:*

Be it known that I, WILLIAM P. M. GRELCK, a citizen of the United States, residing at the city of Lincoln, in the county of Lancaster and State of Nebraska, have invented certain new and useful Improvements in Milk-Food Products and Methods of Making the Same, of which the following is a specification.

My invention relates to food products and particularly to those which are primarily founded upon the solid constituents of milk, especially that from which the butterfat has been removed, and thereby has become a creamery by-product. It may, however, be used in connection with the milk solids in which the butterfats have been retained in whole or part. My process involves the use of the milk solids of buttermilk or separated or whole milk so prepared as to become a more easily digestible product, the individual elements thereof being non-adherent and readily divisible. And to make the best possible use of such solids in the art of bread making, for which my product is primarily designed, I mingle with the same, preferably in the process of manufacture, a considerable quantity of malt extract, thus producing what may be described as a malted acid milk product.

It is a matter of general knowledge that the gradually increasing production of lactic acid in milk resulting from the action of the lactic acid bacteria tends to precipitate the casein thereof, and that such precipitation is aided by the application of heat. The casein so precipitated normally forms a solid coherent mass separated from the milk serum or whey which, unless further treated, retains the greater portion of the milk albumin, sugar and salts. The curd thus formed is non-soluble in water, except upon the addition of alkalis or strong acids which make it unavailable for food purposes.

But by permitting a certain amount of lactic acid to form, up to from 0.3 to 0.6 per cent. of the bulk, applying heat thereto sufficient to raise the product to about 140 degrees Fahr., and violently agitating the milk meanwhile, the precipitation or separation of the casein from its natural solution or suspension in the milk serum is effected. But the molecular elements which at the instant of precipitation are mutually coherent are prevented from coming into such contact with each other as to permit the individual cohesion thereof. The tendency or capacity for such adhesion speedily passes. And the resultant precipitated casein instead of being in the form of a strongly adherent undissolvable curd is in the form of an extremely large number of non-adherent particles in suspension in the milk fluids. The resulting product may be condensed to semi-solid consistency and then dried, preferably *in vacuo*, and affords a valuable food product which may be put into solution by mingling it with water, and thus or in other ways used with flour or other ingredients in the manufacture of bread.

The value of this product may be greatly enhanced and a considerable convenience afforded by the mixture therewith of a certain proportion, preferably about 25%, of the extract of malt. This also is largely used by bakers in the production of bread, thereby making a more digestible product as the diastase acts on the soluble starch to transform it into dextrin during the process of fermentation, while the resulting maltose is acted upon by the yeast in the well-known manner to give off the leavening carbonic dioxid gas and alcohol.

While the constituents severally derived from the malt and milk used may be separately prepared and then mixed together, I prefer to produce the elements concurrently and mingle them as a part of the process, so that when it is conducted to the point where the desired amount of water is removed the resulting product will be a uniform and homogeneous one. In either case I consider the desirable proportion of the elements mingled to be approximately one of malt solids to four of the milk solids.

A diagrammatic representation of apparatus which may be used in carrying out the principles of my invention is shown in the drawings, in which 1 represents a tank adapted for the reception of soured milk through the inlet opening 2. It is provided with suitable stirring apparatus 3. 4 is a second receptacle having stirring apparatus 5, and inlet opening 6. A tubular connection 7 is provided by which the soured milk in fluid condition is drawn from tank 1 to receptacle 4; and 8 is a connection through which high pressure steam may be forced through the nozzle 9 into the pipe 7. It thus acts to draw the milk from tank 1, meeting the same at the point of steam discharge and heating it so as to cause a precipitation of casein from the soured milk. The pressure of the steam should be so controlled as to heat the milk to about 160 defrees Fahr., at which temperature pasteurization will take place and the further production of lactic acid bacteria prevented. The forcible impact of the steam upon the soured milk will prevent the adhesion of the particles of casein as precipitated. As the milk fluids with the precipitated particles of the casein are carried into the receptacle 4 the action of the stirrer upon the heated fluid will prevent the formation of agglutinated masses by adhesion of the particles of casein. In the vat 10 provided with the inlet 11 and outlet 12 may be placed ground barley malt mixed with from four to five times its bulk of water, sufficient to make a suitable mash, and this being heated to about 135 to 150 degrees Fahr., a wort rich in malt diastase will be formed, although the details of such preparation of malt extract form no part of my invention. Connection is made by means of the pipes 13 and 14 with the vacuum pan 15. The latter is provided with a vacuum pump 16 and suitable condenser 17. When a vacuum is produced in the vacuum pan a flow of fluids from the receptacle 4 and the vat 10 may be produced in proper proportion by means of the valves 4' and 10'. After a sufficient quantity of the fluids from receptacle 4 and tank 10 in proper proportion to each other is contained in the vacuum pan, the operation thereof will remove the surplus water, leaving the finished product in semi-solid condition and ready to be removed and placed for use. It will be noted that in order that the diastase may be preserved the heat in the vacuum pan should not exceed about 150 degrees Fahr., although at the same time this heat is sufficient to finish any sterilization of the milk which before had been begun and which may not have been fully completed up to the time that it was carried into the vacuum pan.

The product which is a part of my invention is not to be considered limited to the particular manner in which the particles or molecules of casein are precipitated and made mutually non-adherent. It is equally a part of my invention if such condition of the casein is produced by other means than that herein set out as, for instance, that shown and described in my Patent No. 1,230,479, issued June 19, 1917.

I claim:—

1. The method of preparing a food product from soured milk which consists in subjecting the milk to the action of a steam jet, whereby the casein is precipitated and fixed in the form of minute mutually non-adherent particles.

2. The method of preparing a food product from soured milk which consists in subjecting the milk to the action of a steam jet, whereby the casein is precipitated, and agitating the milk whereby the casein is fixed in the form of minute mutually non-adherent particles.

3. The method of preparing a food product from soured milk which consists in subjecting the milk to the action of a steam jet, whereby the casein is precipitated and fixed in the form of minute mutually non-adherent particles, and then evaporating the excess fluids *in vacuo* at a pasteurizing temperature.

4. The method of preparing a food product from soured milk which consists in precipitating the casein, agitating the precipitated particles so that they become mutually non-adherent, and intermingling extract of malt with the said particles and removing the excess fluid therefrom.

5. The method of preparing a food product from soured milk which consists in precipitating the casein, agitating the precipitated particles so that they become mutually non-adherent, adding extract of malt thereto, and evaporating the excess fluids at a temperature lower than that destructive of malt diastase.

6. As a new article of manufacture; a food product comprising malt extract and the solids of soured milk in which the casein is present in the form of fixed discontinuous particles.

7. As a new article of manufacture; a food product comprising malt extract and the casein of sour milk in the form of fixed discontinuous particles.

8. As a new article of manufacture; a food product including malt extract and the casein and butterfats of sour milk.

9. An acid milk food product having a casein content in the form of minute precipitated fixed discontinuous non-adherent particles with which extract of malt is intermingled.

10. An acid milk food product having a casein content in the form of minute precipitated fixed discontinuous non-adherent particles with which extract of malt is intermingled, and containing a preservative quantity of lactic acid.

11. A pasteurized acid milk food product having the casein thereof in minute precipitated fixed discontinuous non-adherent particles intermingled with extract of malt.

In witness whereof, I have hereunto subscribed my name, this 20th day of December, 1916, at Lincoln, in the county of Lancaster and State of Nebraska.

WILLIAM P. M. GRELCK.

DISCLAIMER.

1272035—*William P. M. Grelck*, Evanston, Ill. SELF-PRESERVING ACID MILK PRODUCT AND PROCESS OF MAKING THE SAME. Patent dated June 19, 1917. Disclaimer filed February 3, 1928, by the assignee by mesne assignments, *Grelck-Hovey Patent Company*, with approval of licensee, *Consolidated Products Co.*

Hereby disclaim all matter described in lines 100 to 110 of page 2 of the specification, which paragraph is hereby cancelled; from the scope of claims 1, 2, 3, and 14 only and from no other claims any process for producing a food product consisting substantially wholly of buttermilk, and from the scope of claims 10, 11, and 12 any food product except concentrated moist products, and from the scope of claim 13 any food product consisting substantially wholly of the constituents of buttermilk.

[*Official Gazette February 21, 1928.*]